July 16, 1935. C. E. HOLLAND 2,008,614
DRY BOWL PIPE
Filed April 5, 1933
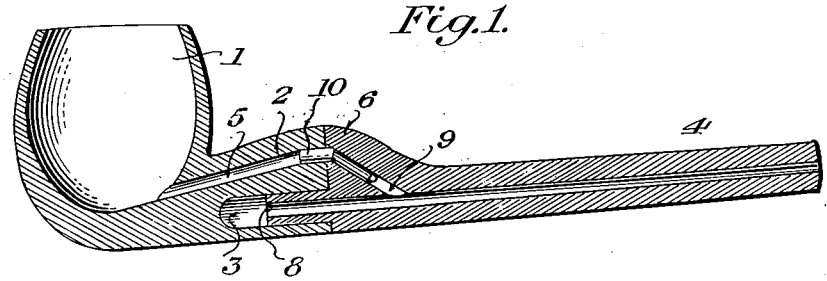
Fig.1.
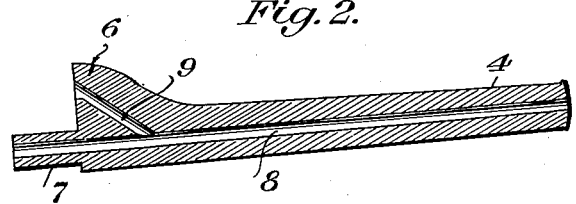
Fig.2.
Fig.4.
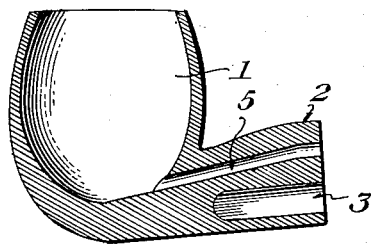
Fig.3.
INVENTOR.
Charles Elbert Holland Patented July 16, 1935

2,008,614

UNITED STATES PATENT OFFICE 2,008,614

DRY BOWL PIPE

Charles Elbert Holland, Fairforest, S. C.

Application April 5, 1933, Serial No. 664,527

1 Claim. (Cl. 131—12)

This invention relates to smoking pipes and has for the primary object, the provision of means for maintaining the bowl of a pipe free of moisture, saliva and the like so that the tobacco therein will not become soggy or wet, consequently permitting a dry and natural tobacco flavored smoke to be had by the user.

Another object of this invention is the provision of specially constructed smoke passages and a trap cooperating therewith to prevent the fluid in the mouthpiece from reaching the bowl of the pipe and permit said fluid to accumulate in the trap, whence the latter may be readily emptied and cleaned by simply detaching the mouthpiece from the stem of the pipe.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a smoking pipe constructed in accordance with my invention.

Figure 2 is a vertical sectional view illustrating the mouthpiece.

Figure 3 is a perspective view illustrating a connecting tube employed between the smoke passages of the pipe stem and the mouthpiece.

Figure 4 is a vertical sectional view illustrating the bowl and its stem.

Referring in detail to the drawing, the numeral 1 indicates a bowl and formed integrally therewith a stem 2 which preferably increases in size towards its free end. Formed in the stem 2 is a recess or chamber 3 which opens outwardly through the free end of the stem and cooperates with a mouthpiece 4 in forming a trap to collect moisture, saliva and the like. Formed in the stem 2 is a smoke passage 5, one end of which communicates with the bowl 1 at the bottom of the latter and the other end extends through the free end of the stem in a plane above the chamber 3. The smoke passage 5 inclines upwardly from its end which communicates with the bowl towards the other end that opens outwardly through the free end of the stem.

The mouthpiece 4 has one end shaped to form an enlargement 6 and a shaft 7. A smoke passage 8 extends through the extension and the mouthpiece proper. The enlargement is of the same size and shape as the free end of the stem and the extension 7 enters the chamber 3 when the mouthpiece is assembled to the stem. The extension has frictional contact with the walls of the chamber and terminates short of the inner wall of said chamber so as to cooperate with the latter in forming the trap. An inclined smoke passage 9 is formed in the enlargement and one end opens outwardly of said enlargement to align with the smoke passage 5 when the mouthpiece is assembled to the stem and the other end of the passage 9 communicates with the smoke passage 8 laterally of the extension 7. The smoke passage 9 enters through the top wall of the smoke passage 8, that is, when the pipe is held in a smoking position so that any saliva, moisture or the like accumulating in the smoke passage 8 will be prevented from entering the passages 9 and 5 and consequently kept from the interior of the bowl. As the passage 8 extends straight into the chamber 3, the accumulated saliva or moisture may flow freely into the trap either when the pipe is in smoking position or the bowl slightly tilted downwardly with respect to the free end of the mouthpiece.

A tube 10 is fitted in the smoke passage 9 and has an angularly related portion which projects into the smoke passage 5 when the mouthpiece is assembled to the stem. The tube 10 tightly fits the walls of the respective passages 9 and 5 so that a tight connection is established between said passages 5 and 9 where they join with one another.

Having described the invention, I claim:

A smoking pipe comprising a bowl, a stem integral with the bowl and provided with a smoke passage communicative at one end with the interior of the bowl and having its opposite end opening outwardly through the free end of said stem, said smoke passage inclining upwardly from its communication with the bowl, said stem having a chamber arranged below the smoke passage and opening outwardly through the free end of said stem, a straight mouthpiece having one end inserted in the chamber and provided with a smoke passage communicative at one end with said chamber, an enlargement formed on the mouthpiece and shaped to conform to and abutting the free end of the stem and provided with an upwardly inclined smoke passage having its uppermost end communicative with the uppermost end of the first-named smoke passage whereby said first and third-named smoke passages cooperate in presenting a substantially V-shaped formation, said third-named smoke passage having its lowermost end in communication with the second-named smoke passage, and a tube having angularly related portions extending into the first and third-named smoke passages.

CHARLES ELBERT HOLLAND.